US012194648B1

(12) United States Patent
Ronan

(10) Patent No.: US 12,194,648 B1
(45) Date of Patent: Jan. 14, 2025

(54) UTILITY KNIFE

(71) Applicant: John S. Ronan, Temecula, CA (US)

(72) Inventor: John S. Ronan, Temecula, CA (US)

( * ) Notice: Subject to any disclaimer, the term of this patent is extended or adjusted under 35 U.S.C. 154(b) by 201 days.

(21) Appl. No.: 18/117,464

(22) Filed: Mar. 5, 2023

Related U.S. Application Data

(60) Provisional application No. 63/359,825, filed on Jul. 9, 2022.

(51) Int. Cl.
*B26B 5/00* (2006.01)
*B26B 1/04* (2006.01)

(52) U.S. Cl.
CPC .............. *B26B 5/006* (2013.01); *B26B 1/042* (2013.01)

(58) Field of Classification Search
CPC ........... B26B 5/006; B26B 5/00; B26B 5/005; B26B 1/042; B26B 1/00; B26B 1/02; B26B 1/04
USPC ............................... 30/2, 151, 153, 155–161
See application file for complete search history.

(56) References Cited

U.S. PATENT DOCUMENTS

2003/0150116 A1* 8/2003 Scala ...................... B26B 1/044 30/330
2009/0165309 A1* 7/2009 Kamb ...................... B26B 1/02 30/162
2019/0015996 A1* 1/2019 Dechant .................... B26B 5/00

* cited by examiner

*Primary Examiner* — Phong H Nguyen
(74) *Attorney, Agent, or Firm* — QuickPatents; Kevin Prince

(57) ABSTRACT

A utility knife includes a housing pivotally fixed with a blade holder that can move between a retracted position with the blade holder at least partially contained within the housing, and an extended position. A spring clip spans at least partially across the blade holder and traverses a spring clip slot to engage a notch of a utility blade held within the blade holder. When pressed upwardly, the spring clip clears the notch of the blade, releasing the blade within the blade holder such that the blade can be pulled out of and away from the blade holder. In use, with the blade holder in the retracted position, the blade holder can be moved into the extended position by pressing against the actuator section of the spring clip. The utility knife can be used in this manner with either the left or right hand.

14 Claims, 4 Drawing Sheets

UTILITY KNIFE

CROSS-REFERENCE TO RELATED APPLICATIONS

This application claims the benefit of U.S. Provisional Patent Application 63/359,825, filed on Jul. 9, 2022, and is incorporated herein by reference.

STATEMENT REGARDING FEDERALLY SPONSORED RESEARCH AND DEVELOPMENT

Not Applicable.

FIELD OF THE INVENTION

This invention relates to knives, and more particularly to a utility knife with integrated blade storage and quick deployment.

BACKGROUND

Utility knives, sometimes also referred to as "box cutters" or "box cutting knives," are well known tools for facilitating the cutting of all types of objects, such as carboard, carpet, vinyl flooring, straps, string, and the like. Frequently the razor-blade type blades of such knives quickly become dull, requiring the blade to be flipped over internal to the knife or, if both sides of the blade are dull, replacing the blade with a new one. However, conventional utility knives require two half-shells to be separated by unscrewing a screw, removing the blade or flipping the blade over, and reassembling the two half-shells. Not only might this process require a screwdriver in most cases, but removing and reinstalling the blades in such conventional utility knives is difficult as a blade must be precisely aligned with a blade carrier, which is often challenging.

Therefore, there is a need for a utility knife that allows a user to quickly deploy, retract, exchange, or flip-over a utility blade. Such a needed device would allow for convenient deployment of the blade with either the left or right hand, and would allow for convenient removal and replacement of the blade, also with either the left or right hand. Such a needed invention would also be relatively inexpensive to manufacture and intuitive to use. The present invention accomplishes these objectives.

SUMMARY OF THE INVENTION

The present device is a utility knife for use with a blade of the type having a sharpened first edge and at least one retaining notch in an opposing second edge. The utility knife includes a housing that has a first side, a second side, a front end, a rear end, a top side, an open bottom side, and an interior space that is accessible through the open bottom side. The front end of the housing includes a pivot aperture traversing the first side and the second side.

The top side of the housing includes a retention mechanism that preferably includes a rocker arm that has a proximal end, a distal end, and a central pivot aperture. The distal end is adapted to retain the blade holder in the extended position until retracted from the rear end of the blade holder by depressing the proximal end downwardly from the top side of the housing. A retention spring urges the proximal end of the rocker arm upwardly.

A blade holder has a first side, a second side, an open front end, a rear end, a top side, a bottom side, and an interior space accessible through the open front end. The rear end of the blade holder includes the pivot aperture traversing the first side and the second side and aligned with the pivot apertures of the housing. A pivot pin traverses all of the pivot apertures to enable pivotable movement of the blade holder with respect to the housing, between an extended position, wherein the housing and the blade holder are generally aligned, and a retracted position, wherein the blade holder is at least partially received within the interior space of the housing through the open bottom side. The blade holder further includes an elongated spring clip slot, a first spring clip aperture traversing at least the first side of the blade holder, and a second spring clip aperture traversing at least the second side of the blade holder.

The utility knife further includes a spring clip that has a first end rotationally fixed with the first spring clip aperture, and a second end rotationally fixed with the second spring clip aperture. An actuator section of the spring clip spans at least partially across the blade holder and traverses the spring clip slot at a traversing section. The first spring aperture and the second spring aperture are mutually offset, causing the spring clip to be urged towards the bottom side of the blade holder into an inward position, wherein the spring clip engages the blade with the traversing section thereof engaging the at least one retaining notch of the blade, inhibiting the blade from sliding within the interior space of the blade holder. The spring clip, when moved towards the top side of the blade holder into an outward position, clears the at least one notch of the blade, releasing the blade within the interior space of the blade holder such that the blade can be pulled out of and away from the blade holder.

In use, with the blade holder in the retracted position, the blade holder can be moved into the extended position by pressing against the actuator section of the spring clip, a force needed to overcome the retention mechanism being less than a force needed to move the spring clip from the inward position to the outward position. The utility knife can be used in this manner with either the left or right hand.

The present invention allows a user to quickly deploy, exchange, or flip-over a utility blade. Such a needed device provides for convenient deployment of the blade with either the left or right hand, and allows for convenient removal and replacement of the blade, also with either the left or right hand. The present invention is relatively inexpensive to manufacture and intuitive to use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
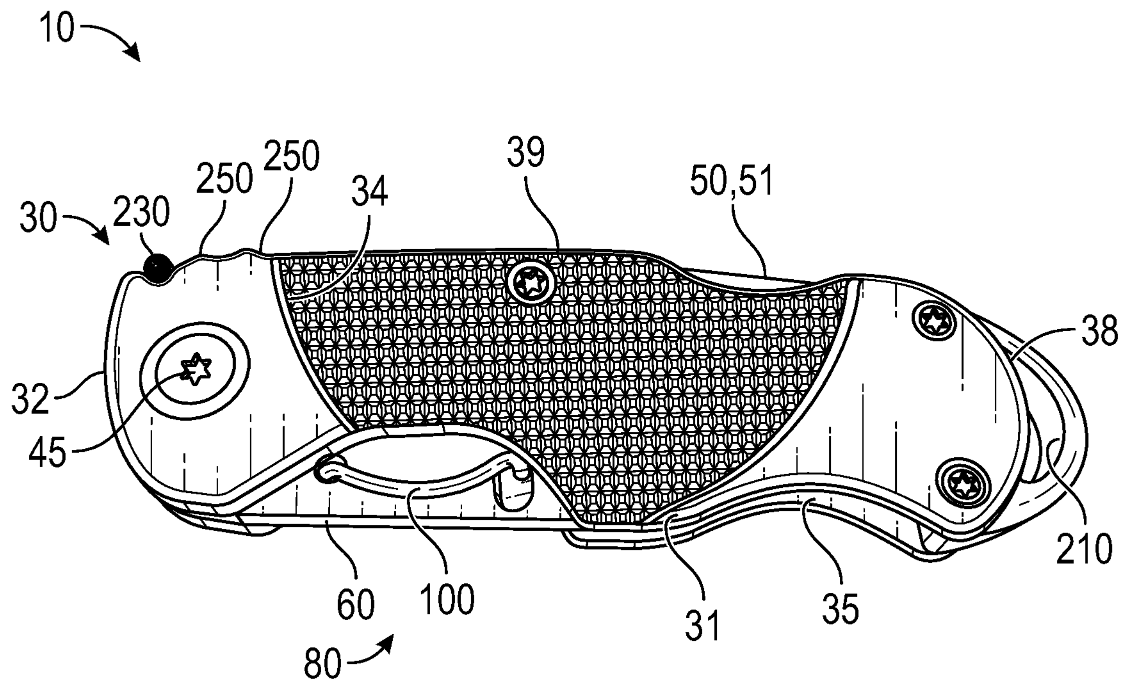
FIG. 1 is a perspective view of the invention, illustrated with a blade holder in a retracted position.
Figure 2:
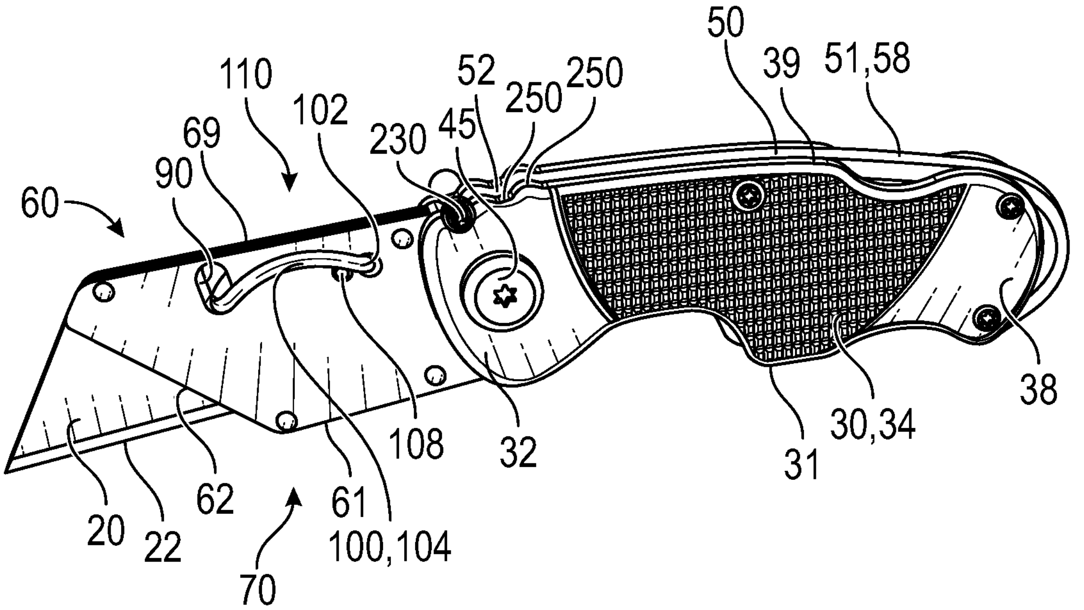
FIG. 2 is a perspective view of the invention, illustrated with the blade holder in an extended position.
Figure 3:
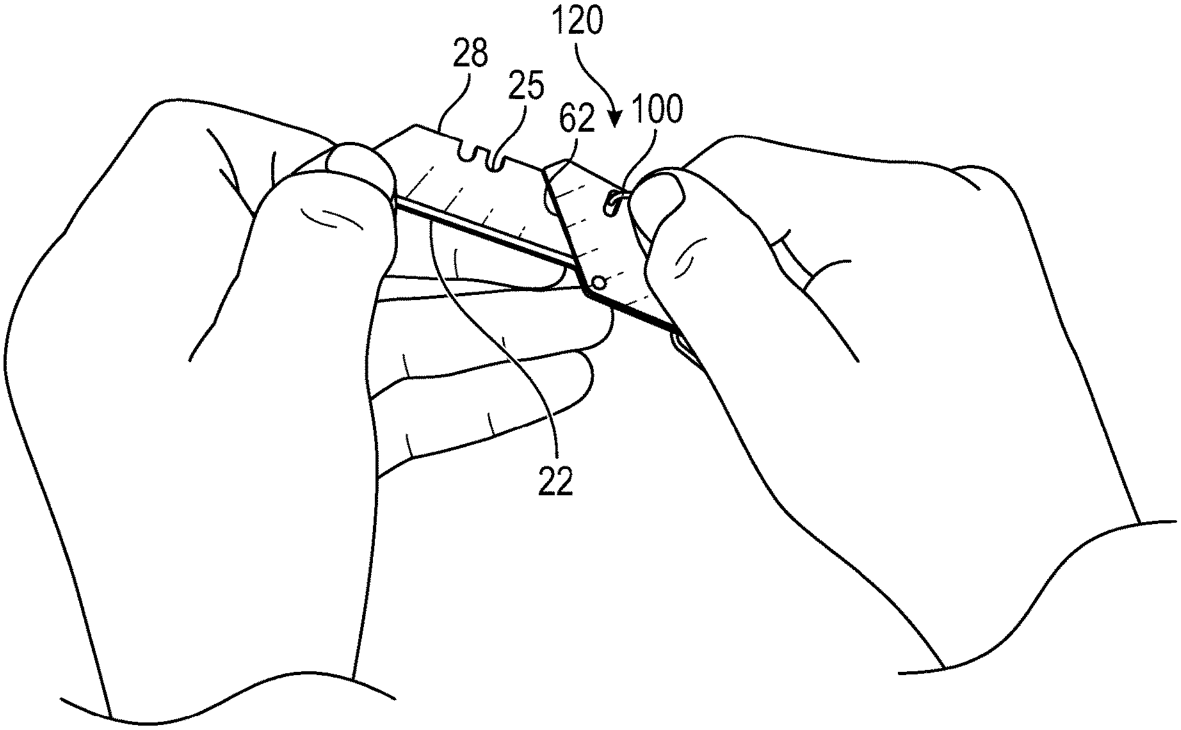
FIG. 3 is a perspective view of the invention, illustrated with a blade being removed from the blade holder of the invention, a spring clip being pushed into an outward position to release the blade from the blade holder.
Figure 4:
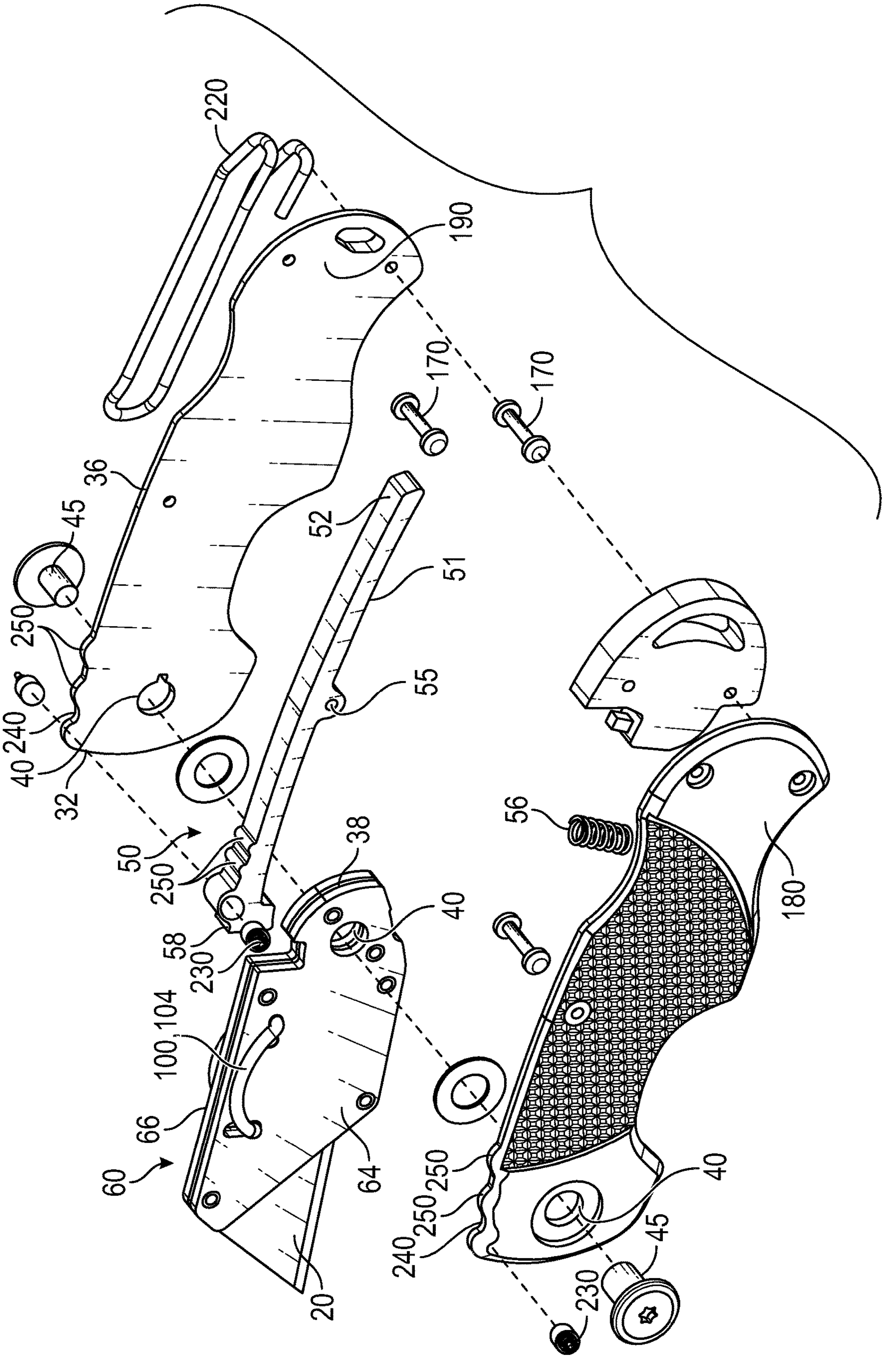
FIG. 4 is an exploded perspective view of the invention, illustrated with the blade holder assembled but with a housing of the invention exploded.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a utility knife 10 for use with a blade 20 of the type having a sharpened first edge 22 and at least one retaining notch 25 in an opposing second edge 28. Such a blade 20 is typically referred to as a utility blade, or a utility knife blade, and is common in the art.

The utility knife 10 includes a housing 30 (FIGS. 1, 2, and 4) that has a first side 34, a second side 36, a front end 32, a rear end 38, a top side 39, an open bottom side 31, and an interior space 35 that is accessible through the open bottom side 31. The front end 32 of the housing 30 includes a pivot aperture 40 traversing the first side 34 and the second side 36. Preferably the housing 30 comprises a first side section 180 (FIG. 4), a central spacer 190, and a second side section 200, all fixed together with a plurality of rivets 170 or other suitable mechanical fasteners (not shown). Preferably the central spacer 190 extends rearwardly past the first side section 180 and the second side section 200 to terminate with a keychain aperture 210. A belt clip 220 (FIG. 4) may be further fixed to the second side section 200 to allow for the utility knife 10 to be selectively fixed with a person's belt, or similar item. The housing 30 is preferably made from a rigid metallic material, such as stainless steel or the like.

The top side 38 of the housing includes a retention mechanism 50. Preferably the retention mechanism 50 includes a rocker arm 51 (FIG. 4) that has a proximal end 52, a distal end 58, and a central pivot aperture 55. The distal end 58 is adapted to retain the blade holder 60 in the extended position 70 until retracted from the rear end 68 of the blade holder 60 by depressing the proximal end 52 downwardly from the top side 39 of the housing 30. A retention spring 56 urges the proximal end of the rocker arm 51 upwardly. As such, momentarily depressing the proximal end 52 of the rocker arm 51 releases the blade holder 60 to pivot from the extended position 70 to the retracted position 80. The rear end 68 of the blade holder 60 is adapted to maintain the blade holder 60 in the retracted position 80 through a force of the retention spring 56 and friction, but preferably the blade holder 60 can be moved from the retracted position 80 to the extended position 70 without the proximal end 52 of the rocker arm 51 being depressed.

A blade holder 60 has a first side 64, a second side 66, an open front end 62, a rear end 68, a top side 69, a bottom side 61, and an interior space 65 accessible through the open front end 62. The rear end 68 of the blade holder 60 includes the pivot aperture 40 traversing the first side 64 and the second side 66 and aligned with the pivot apertures 40 of the housing. A pivot pin 45 traverses all of the pivot apertures 40 to enable pivotable movement of the blade holder 60 with respect to the housing 30, between an extended position 70 (FIG. 2) wherein the housing 30 and the blade holder 60 are generally aligned, and a retracted position 80 (FIG. 1) wherein the blade holder 60 is at least partially received within the interior space 35 of the housing 30 through the open bottom side 31. The blade holder 60 is preferably made from a rigid metallic material, such as stainless steel or the like.

The blade holder 60 is cooperative with the retention mechanism 50 of the housing 30 to maintain the blade holder 60 in the extended position 70 when the blade holder 60 is in the extended position 70, and to maintain the blade holder 60 in the retracted position 80 when the blade holder 60 is in the retracted position 80.

The blade holder 60 further includes an elongated spring clip slot 90, a first spring clip aperture 91 traversing at least the first side 64 of the blade holder 60, and a second spring clip aperture 92 traversing at least the second side 66 of the blade holder 60.

Figure 5:
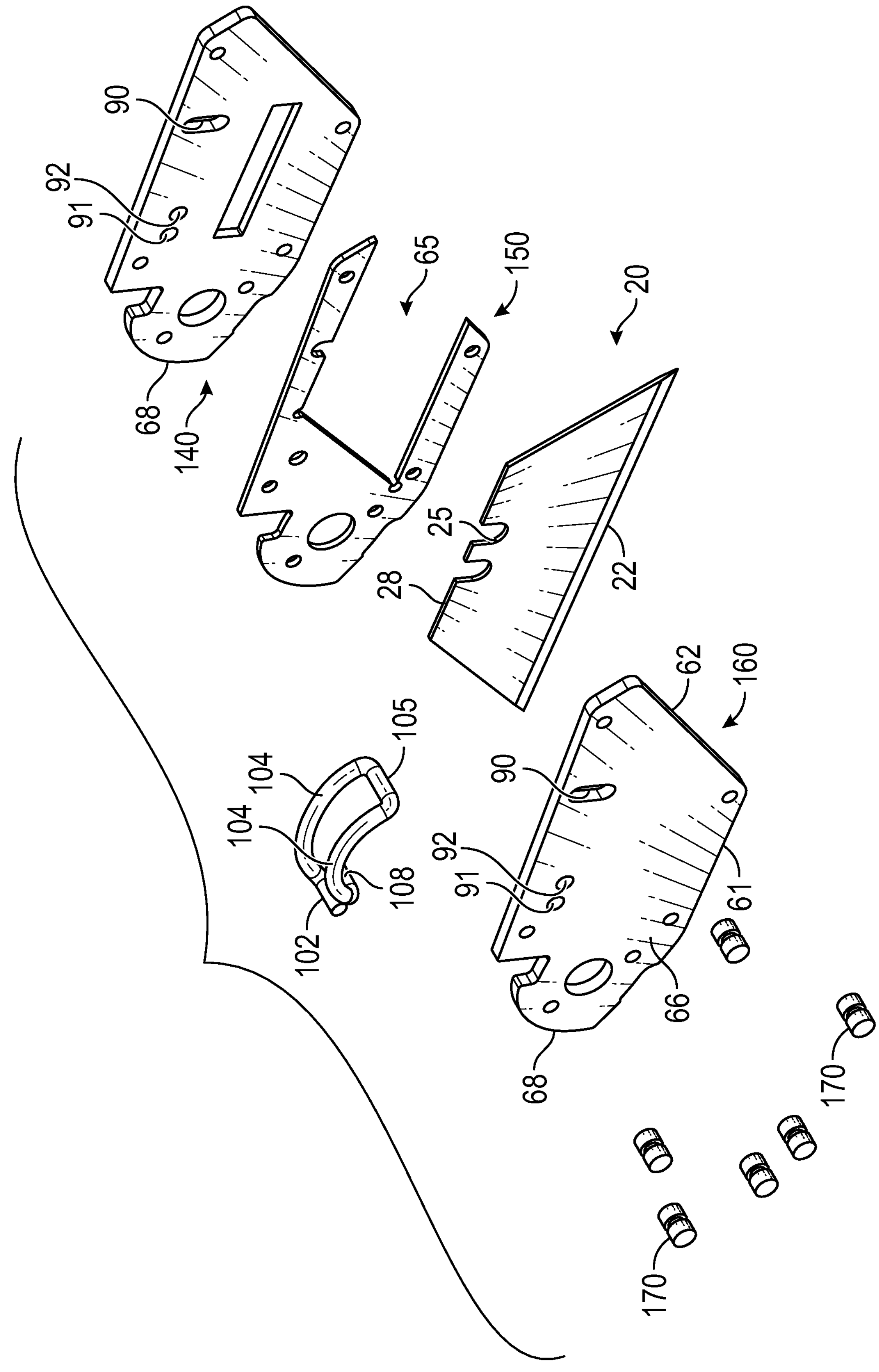
FIG. 5 is an exploded reverse perspective view of the blade holder of the invention.

The utility knife 10 further includes a spring clip 100 that has a first end 102 rotationally fixed with the first spring clip aperture 91, and a second end 108 rotationally fixed with the second spring clip aperture 92. An actuator section 104 of the spring clip 100 spans at least partially across the blade holder 60 and traverses the spring clip slot 90 at a traversing section 105 (FIG. 5). Preferably the actuator section 104 of the spring clip 100 is arched upwardly toward the top end 69 of the blade holder 60. The first spring aperture 91 and the second spring aperture 92 are mutually offset, causing the spring clip 100 to be urged towards the bottom side 61 of the blade holder 60 into an inward position 110, wherein the spring clip 100 engages the blade 20 with the traversing section 105 thereof engaging the at least one retaining notch 25 of the blade, inhibiting the blade 20 from sliding within the interior space 65 of the blade holder 60. The spring clip 100, when moved towards the top side 69 of the blade holder 60 into an outward position 120 (FIG. 3), clears the at least one notch 25 of the blade 20, releasing the blade 20 within the interior space 65 of the blade holder 60 such that the blade 20 can be pulled out of and away from the blade holder 60.

In use, with the blade holder 60 in the retracted position 80, the blade holder 60 can be moved into the extended position 70 by pressing against the actuator section 104 of the spring clip 100, a force needed to overcome the retention mechanism being less than a force needed to move the spring clip 100 from the inward position 110 to the outward position 120.

Preferably the blade holder 60 comprises a first side section 140 (FIG. 5), a central blade receiving section 150, and a second side section 160, each section 140,150,160 being generally flat and fixed mutually together with a plurality of rivets 170, or other suitable mechanical fasteners.

Preferably the rocker arm 51 further includes at least one thumb stud 230 projecting laterally away from the distal end 58 thereof, whereby pushing up on the at least one thumb stud 230 to release the blade holder 60 to pivot from the extended position 70 to the retracted position 80. Preferably the at least one thumb stud 230 includes two of the thumb studs 230, each projecting laterally away from each other and the distal end 58 of the rocker arm 51. The first side 34 and the second side 36 of the housing 30 each include a notch 240 adapted to receive a portion of one of the thumb studs 230 therethrough. Additionally, ridges 250 (FIG. 4) may be formed in the rocker arm 51, the first side 34, and the second side 36 for facilitating gripping of the utility knife 10.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A utility knife for use with a blade having a sharpened first edge and at least one retaining notch in an opposing second edge, the utility knife comprising:

a housing having a first side, a second side, a front end, a rear end, a top side, an open bottom side, and an interior space accessible through the open bottom side, the front end of the housing including a pivot aperture traversing the first side and the second side, the top side of the housing including a retention mechanism;

a blade holder having a first side, a second side, an open front end, a rear end, a top side, a bottom side, and an interior space accessible through the open front end, the rear end of the blade holder including a pivot aperture traversing the first side and the second side and aligned with the pivot apertures of the housing, a pivot pin traversing all of the pivot apertures enabling pivotable movement of the blade holder with respect to the housing between an extended position wherein the housing and the blade holder are generally aligned, and a retracted position wherein the blade holder is partially received within the interior space of the housing through the open bottom side, the blade holder cooperative with the retention mechanism of the housing to maintain the blade holder in the extended position when the blade holder is in the extended position, and to maintain the blade holder in the retracted position when the blade holder is in the retracted position, the blade holder further including an elongated spring clip slot, a first spring clip aperture traversing the first side of the blade holder, and a second spring clip aperture traversing the second side of the blade holder, the first spring aperture and the second spring aperture mutually offset, the blade partially receivable within the interior space of the blade holder through the open front end of the blade holder;

a spring clip having a first end rotationally fixed with the first spring clip aperture, a second end rotational fixed with the second spring clip aperture, an actuator section of the spring clip spanning at least partially across the blade holder and traversing the spring clip slot, the spring clip urged towards the bottom side of the blade holder into an inward position wherein the spring clip restrains the blade from sliding within the interior space of the blade holder, the spring clip when moved towards the top side of the blade holder into an outward position releasing the blade within the interior space of the blade holder such that the blade can be pulled out of and away from the blade holder;

whereby with the blade holder in the retracted position, the blade holder can be moved into the extended position by pressing against the actuator section of the spring clip, a force needed to overcome the retention mechanism being less than a force needed to move the spring clip from the inward position to the outward position.

2. The utility knife of claim 1 wherein the actuator section of the spring clip is arched upwardly towards the top end of the blade holder.

3. The utility knife of claim 1 wherein the blade holder comprises a first side section, a central blade receiving section, and a second side section, each section being generally flat and fixed together with a plurality of rivets.

4. The utility knife of claim 1 wherein the retention mechanism includes a rocker arm having a proximal end, a distal end, and a central pivot aperture, the distal end adapted to retain the blade holder in the extended position until retracted from the rear end of the blade holder by depressing the proximal end downwardly from the top side of the housing, a retention spring urging the proximal end of the rocker arm upwardly.

5. The utility knife of claim 1 wherein the housing comprises a first side section, a central spacer, and a second side section, all fixed together with a plurality of rivets.

6. The utility knife of claim 5 wherein the central spacer extend rearwardly past the first side section and the second side section, and terminates with a keychain aperture.

7. The utility knife of claim 1 wherein the second side section includes a resilient belt clip configured to allow for the utility knife to be selectively fixed with a belt of a person.

8. The utility knife of claim 1 wherein the rocker arm further includes at least one thumb stud projecting laterally away from the distal end thereof, whereby a person may push up on the at least one thumb stud to release the blade holder to pivot from the extended position to the retracted position.

9. The utility knife of claim 8 wherein the at least one thumb stud includes two of the thumb studs, each projecting laterally away from each other and the distal end of the rocker arm.

10. The utility knife of claim 9 wherein the first side and the second side of the housing each include a notch adapted to receive a portion of one of the thumb studs therethrough.

11. A utility knife for use with a blade having a sharpened first edge and at least one retaining notch in an opposing second edge, the utility knife comprising:

a housing having a first side, a second side, a front end, a rear end, a top side, an open bottom side, and an interior space accessible through the open bottom side, the front end of the housing including a pivot aperture traversing the first side and the second side, the housing comprising a first side section, a central spacer, and a second side section, all fixed together with a plurality of rivets, the central spacer extending rearwardly past the first side section and the second side section and terminating with a keychain aperture;

a blade holder having a first side, a second side, an open front end, a rear end, a top side, a bottom side, and an interior space accessible through the open front end, the rear end of the blade holder including a pivot aperture traversing the first side and the second side and aligned with the pivot apertures of the housing, a pivot pin traversing all of the pivot apertures enabling pivotable movement of the blade holder with respect to the housing between an extended position wherein the housing and the blade holder are generally aligned, and a retracted position wherein the blade holder is partially received within the interior space of the housing through the open bottom side, the blade holder cooperative with the retention mechanism of the housing to maintain the blade holder in the extended position when the blade holder is in the extended position, and to maintain the blade holder in the retracted position when the blade holder is in the retracted position, the blade holder further including an elongated spring clip slot, a first spring clip aperture traversing the first side of the blade holder, and a second spring clip aperture traversing the second side of the blade holder, the first spring aperture and the second spring aperture mutually offset, the blade partially receivable within the interior space of the blade holder through the open front end of the blade holder, the blade holder comprising a first side section, a central blade receiving section, and a second side section, each section being generally flat and fixed together with a plurality of rivets;

a spring clip having a first end rotationally fixed with the first spring clip aperture, a second end rotational fixed with the second spring clip aperture, an actuator section of the spring clip spanning at least partially across the blade holder and traversing the spring clip slot, the spring clip urged towards the bottom side of the blade holder into an inward position wherein the spring clip restrains the blade from sliding within the interior space of the blade holder, the spring clip when moved towards the top side of the blade holder into an outward position releasing the blade within the interior space of the blade holder such that the blade can be pulled out of and away from the blade holder, the actuator section of the spring clip being arched upwardly towards the top end of the blade holder;

wherein the top side of the housing including a rocker arm having a proximal end, a distal end, and a central pivot aperture, the distal end adapted to retain the blade holder in the extended position until retracted from the rear end of the blade holder by depressing the proximal end downwardly from the top side of the housing, a retention mechanism urging the proximal end of the rocker arm upwardly;

whereby with the blade holder in the retracted position, the blade holder can be moved into the extended position by pressing against the actuator section of the spring clip, a force needed to overcome the retention mechanism being less than a force needed to move the spring clip from the inward position to the outward position.

12. The utility knife of claim 11 wherein the rocker arm further includes at least one thumb stud projecting laterally away from the distal end thereof, whereby the person may push up on the at least one thumb stud to release the blade holder to pivot from the extended position to the retracted position.

13. The utility knife of claim 12 wherein the at least one thumb stud includes two of the thumb studs, each projecting laterally away from each other and the distal end of the rocker arm.

14. The utility knife of claim 13 wherein the first side and the second side of the housing each include a notch adapted to receive a portion of one of the thumb studs therethrough.

* * * * *